United States Patent
Groves

(10) Patent No.: US 8,736,875 B2
(45) Date of Patent: May 27, 2014

(54) PRINTING ERRORS CONTENT DISPLAYED ON DISPLAY SCREEN

(75) Inventor: Peter Groves, Royston (GB)

(73) Assignee: Xerox Corporation, Norwalk, CT (US)

( * ) Notice: Subject to any disclaimer, the term of this patent is extended or adjusted under 35 U.S.C. 154(b) by 335 days.

(21) Appl. No.: 13/041,654

(22) Filed: Mar. 7, 2011

(65) Prior Publication Data

US 2012/0229842 A1   Sep. 13, 2012

(51) Int. Cl.
*G06F 3/12* (2006.01)
*G06K 15/00* (2006.01)
*G03G 15/00* (2006.01)

(52) U.S. Cl.
USPC .......... 358/1.15; 358/1.13; 358/1.14; 399/10; 399/11; 399/15; 399/18; 399/19

(58) Field of Classification Search
None
See application file for complete search history.

(56) References Cited

U.S. PATENT DOCUMENTS

| | | | | |
|---|---|---|---|---|
| 4,133,477 A | * | 1/1979 | Marino et al. | 714/46 |
| 2003/0156874 A1 | * | 8/2003 | Parry | 400/74 |
| 2007/0014614 A1 | * | 1/2007 | Yoshida | 400/62 |
| 2007/0268510 A1 | * | 11/2007 | Wushour et al. | 358/1.14 |
| 2009/0097058 A1 | * | 4/2009 | Cho | 358/1.15 |
| 2011/0141519 A1 | * | 6/2011 | Hirose | 358/1.15 |

* cited by examiner

*Primary Examiner* — Benny Q Tieu
*Assistant Examiner* — Haris Sabah
(74) *Attorney, Agent, or Firm* — Fay Sharpe LLP

(57) ABSTRACT

Methods and systems are disclosed that generate a screen capture image together with processing selectable options for a user. The screen capture image is saved to a memory of the system and the selectable options are chosen to communicate with an external device and/or helpdesk where information related to the screen can be analyzed or diagnosed for technical issues.

12 Claims, 4 Drawing Sheets

PRINTING ERRORS CONTENT DISPLAYED ON DISPLAY SCREEN

BACKGROUND

The exemplary embodiment relates to fields of image processing. It finds particular application in connection with the provision of captured images on a display, and is described with particular reference thereto. However, a more general application can be appreciated with regard to image classification, image content analysis, image archiving, image database management and searching, and so forth.

A goal of workflow systems, (e.g., with job definition format (JDF) or other formats) is to encompass the whole life cycle of a print and cross-media job, including device automation, management data collection and job-floor mechanical production process, including even such things as bindery and assembly of finished products on pallets. To realize such a globalization across media provider industries, more vendors need to adopt standards. As such, the standards themselves need to be easily manageable for acceptance. Print industries have moved towards technical standards, such as with JDF, other XML based systems, and the like, to facilitate cross-vendor workflow implementations. JDF, for example, is an XML format about job tickets, message descriptions, and message interchanges, which defines both JDF files and a job messaging format based on XML over HTTP. In practice, JDF-enabled products can communicate with each other either by exchanging JDF files, typically via "hot folders," or the net or by exchanging messages over the net. As with other workflow systems, the JDF message contains information that enables each "node" to determine what files it needs as input and where they are found, and what processes it should perform. The "node" then modifies the JDF job ticket to describe what it has done, and examines the JDF ticket to determine where the message and accompanying files should be sent next.

One area of development in information systems is in data management and collection of data for servicing and troubleshooting user work machines. For example, customers on occasion find themselves in a situation where they may want to convey a description and details of the current screen content to a helpdesk. Therefore, a need exits to better convey these descriptions and details.

BRIEF DESCRIPTION

The following presents a simplified summary in order to provide a basic understanding of one or more aspects of the disclosure. This summary is not an extensive overview and is neither intended to identify key or critical elements, nor to delineate the scope thereof. Rather, the primary purpose of the summary is to present some concepts of the disclosure in a simplified form as a prelude to the more detailed description that is presented later.

Methods and system are disclosed that enable a screen capture input to generate a copy of a screen image. The image of the screen content is saved and a menu of selectable options is presented in response to the input. The input is received by a combination of keystrokes or other input. In certain embodiments, an image forming system includes a copier, or a computer with a memory coupled to a processor for executing commands received via resources and instructions stored thereat. A display is operable to present a user interface with graphical and/or textual content in a first screen, and in a second screen, present the selectable options. The first screen is a default screen having the content, in which a screen capture image copies and saves to a temporary file. The second screen includes a pop-up screen that presents the menu of selectable options overlaying or in front of the first screen.

In one embodiment, an image forming system includes a memory coupled to a processor having resources and instructions for executing commands received. A display is configured to display a user interface having graphical images and/or text in a first (default) screen. A screen capture component captures a screen capture image of the graphical images and/or text within the first screen and saves the image. A post-processing engine executes different selectable options within the user interface in a second screen of the display upon receiving a selectable option input. At least one input/output device including a keyboard, keypad, touch screen interface, or voice recognition engine receives a screen capture input based on a single input thereat, which may be a combination of keystrokes, voice activation, or the like. The screen capture input received at the input/output device causes the device to initiate the screen capture component and the post-processing component concurrently. A fill-in feature component activates each selectable option with one or more functions provided in the user interface for selection by the user. For example, a print, save, fax, send or the like functionality present within the user interface activates each selectable option with one or more functions and associated menu details upon a user selection of the options. A communication module communicates the screen capture image to a helpdesk for troubleshooting and/or technical diagnosis. In certain embodiments, the imaging forming system has a toner station that transfers toner to a print medium, such as in a xerographic imaging device with xerographic components that include a photoreceptor, a fusing station, a developing station and the like, for example.

In another embodiment, a method for capturing contents displayed in a display screen is executed via a processor of an image forming apparatus with a memory that stores executable instructions. The method comprises receiving a screen capture input, such as a keystroke combination or the like. A screen capture image of contents displayed in the display screen is captured and selectable options are presented in response to the screen capture input received. An option selection input is received for at least one selectable option from a user and an application function and associated menu details based on a task that corresponds to the at least one selectable option is provided in response to the selection. In some embodiments, processing the selectable option includes allocating resources of the apparatus to the processor that correspond to the application function and associated menu details. A plurality of application functions and associated menu details respectively correspond to the selectable options, wherein the selectable options include different tasks associated with the screen capture image. The method further includes prioritizing the application function and associated menu details as a first priority for resource allocation in the user interface to be processed before other application functions of the apparatus. Additional information is inserted within the screen capture image that includes data associated with the image forming apparatus, such as a serial number, a machine IP address, and a software set in which the data pertains thereto.

The following description and annexed drawings set forth in detail certain illustrative aspects and implementations of the invention. These are indicative of only a few of the various ways in which the principles of the invention may be employed.

DETAILED DESCRIPTION

Figure 1A:
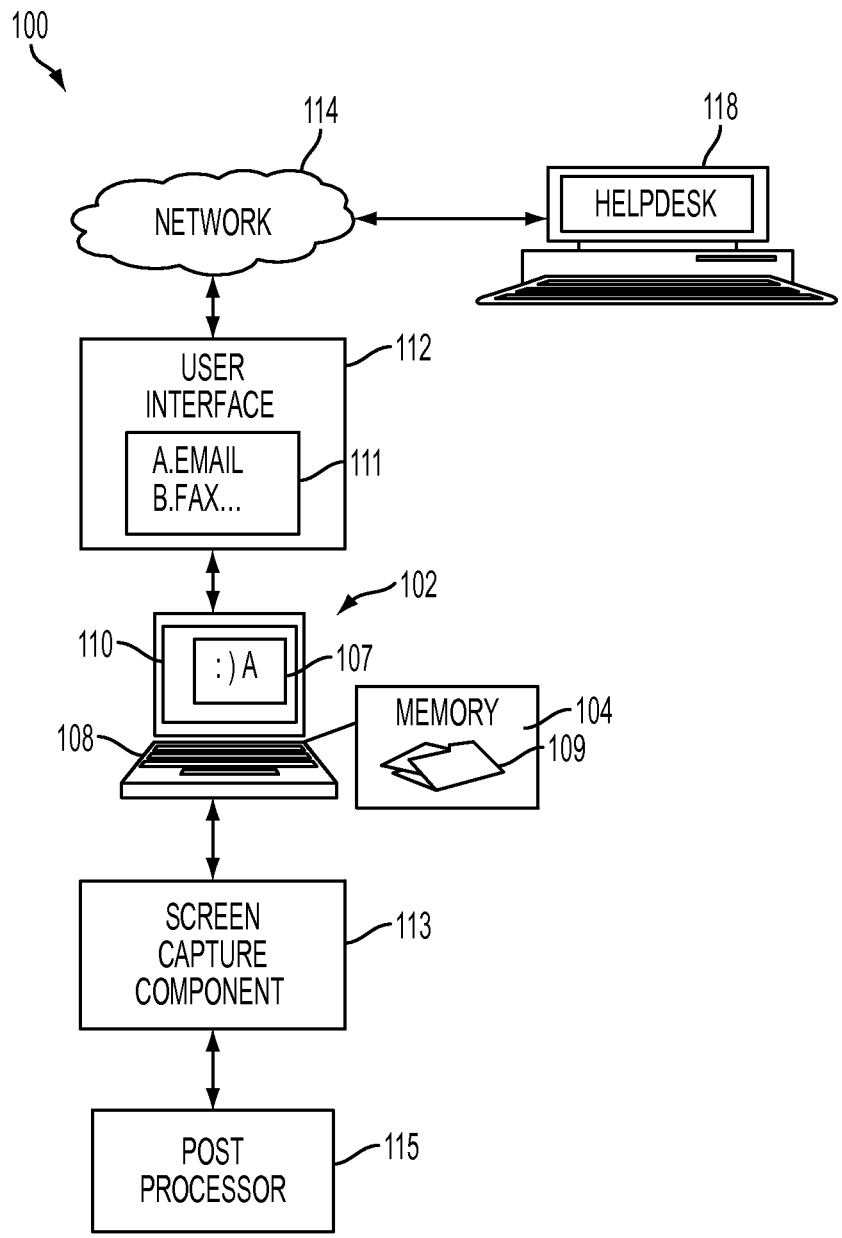
FIGS. 1A-1B are block diagrams of a user interface and control system according to aspects of exemplary embodiments of the disclosure.

One or more implementations of the present disclosure will now be described with reference to the attached drawings, wherein like reference numerals are used to refer to like elements throughout. Aspects of the exemplary embodiments relate to a system (e.g., a xerographic imaging device, an image forming system, computer machine or the like) and methods for providing the ability to capture a screen capture image of a screen while also providing optional selections corresponding to the image capture via a keystroke or other input received from the user. The screen capture function enables the user to convey screen information for visual inspection remotely, such as for diagnostic purposes while also providing users the ability to manipulate screen images captured. Various other options associated with the screen image captured can also be selected by the user in response to the image capture input received. In response to one of the selectable options being selected by the user, a corresponding application function of the system is invoked for performing a task associated with the selectable option.

For example, when logging a problem that has occurred on a computer machine, such as a xerographic imaging device, computer, or the like, a client sometimes desires to convey a description and details of the screen contents, such as when an error screen has been displayed or a maintenance code that is identifiable by a helpdesk or service technician. In these instances, a quick and effective way to convey that information is to provide the user with options to send screen images to the serving party for diagnosis of the technical issues in conjunction with a screen captured image.

One resource that is a part of systems involved in message exchanging and discussed herein, is a help desk, which is an information and assistance resource that troubleshoots problems with computers or similar products. For example, corporations often provide help desk support to their customers via a toll-free number, website and/or e-mail. There are also in-house help desks geared toward providing the same kind of help for employees only. A typical help desk has several functions. It provides the users a single point of contact, to receive help on various computer issues. The help desk may manage its requests via help desk software, such as an issue tracking system.

Referring now to FIG. 1A, illustrates aspects of an exemplary user interface of a computer, imaging device or other system 100 for creating a screen capture image and communicating the image to a helpdesk 118. The system 100 saves the current default screen as a screen capture image and concurrently provides a list of post-processing options 111 related to the image.

For example, a client device, such as a computer device 102 comprises a memory 104 for storing instructions that are executed via a processor therein. The system 100 may include an input/output device 108, such as a keyboard, keypad, mouse, touch screen input or a software component, such as voice recognition software built therein. The device 102 further includes a display 110, a user interface 112, and/or a network connection 114.

In one aspect of an exemplary embodiment, the input/output device 108 provides a screen capture input to capture screen content that may be displayed or rendered in the user interface 112. A screen capture image 107, for example, is saved by a screen capture component 113 within a container for documents, such as a temporary file 109 stored in the memory 104. The screen capture image 107 is saved concurrently with selectable options 111 being presented in the user interface 112 in response to the screen capture input. The selectable options are thereafter executed with the post-processor component 115 according to a user's selection. For example, the user interface is operative to receive a selected option input when the user selects from the selectable options 111, such as sending the screen capture image over the network 114, via use of email functionality, faxing, and other functions that are further detailed below. The content of the screen capture image 107 may contain graphical images and/or text displayed in the display 110 of the computer device 102, for example, which is further saved in the screen capture image 107 and afterwards communicated, saved, printed, or provided for other use based on the selected option chosen by the user.

The network 114 may be in the form of an internet connection, some other connection or may be any device for storing and transferring data for supplying content in digital format, such as by an internet protocol over an internetwork, or local area network, for example. The data or screen content within the screen capture image 107 could be used at a helpdesk, and/or be used as a job request by a client or customer with the content and specifications for a job that may be converted to JDF or some other format language (e.g., XML, or the like). The request may be for printed documents, packaging items, kitting, or the like to be proofed and sent to production, or may be for technical assistance for hardware, software, or other related issues, such as from a helpdesk. The present disclosure is applicable to any context in which a screen capture image may be presented and is not limited to only helpdesk applications, packaging, and/or workflow request environments.

Figure 1B:
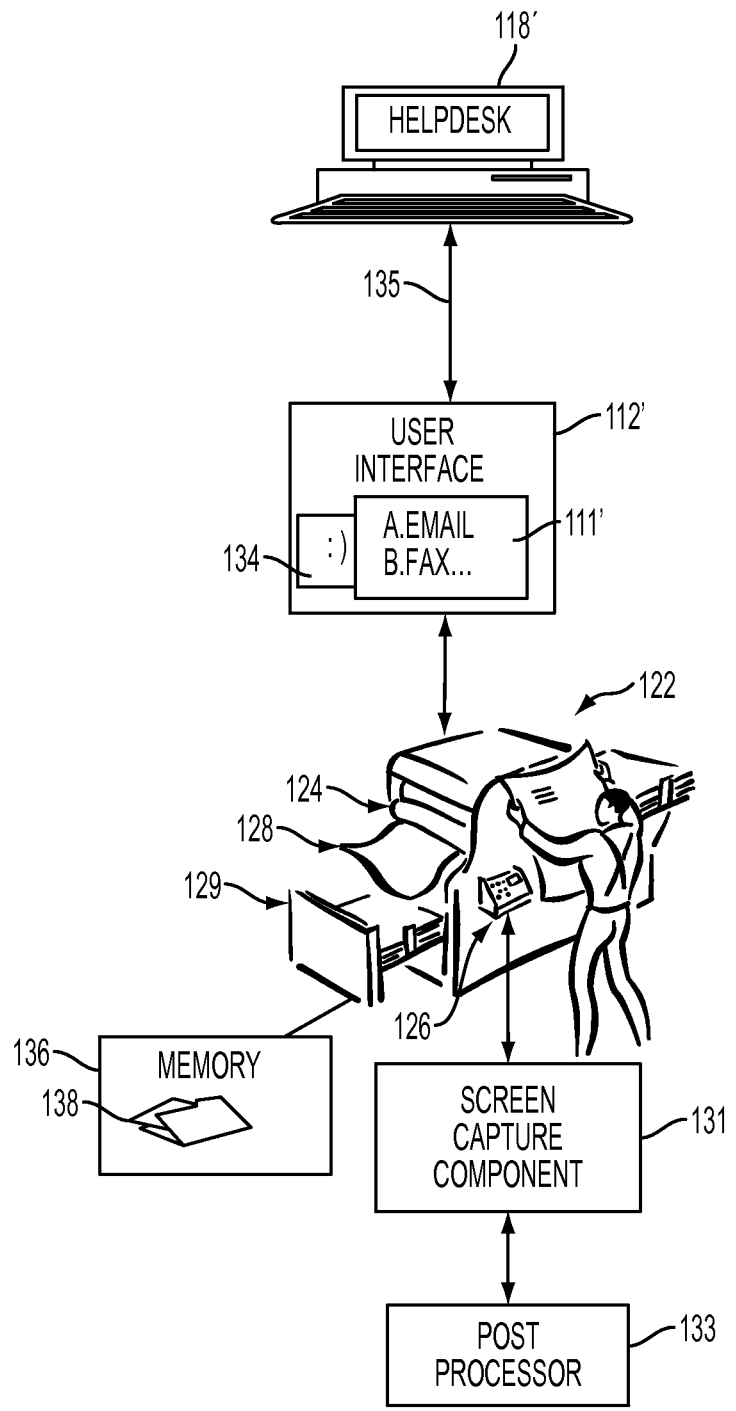

Referring now to FIG. 1B, illustrated is an additional example of the embodiments described above in a xerographic imaging device 122 system, or the like. For example, the device 122 provides a user interface display 126 that provides a user interface and controls thereat, such as a keypad, keyboard, touch screen input device and the like. The imaging device 122 includes various xerographic components, such as a transfer station 124 that transfers toner to a print medium 128 for a final work product (e.g., a maintenance request, or other document request) to be produced and delivered to a client or user. The system 122 includes a feeding/receiving tray 129, as well as a photoreceptor (not shown) and charging station (not shown) for producing a latent image, a developing station (not shown) for developing toner to the latent images and a fusion station (not shown) for fusing toner transferred to the print medium 128. These components are well known within the art and are not described in detail herein.

The interface display 126 is operative to receive a screen capture input at the keyboard (e.g., via a combination of keystrokes), a touch screen, voice activated command or the like. In response to the screen capture input, the interface display 126 captures a screen capture image 134 of the imaging device 122, which is similar to the screen capture image 107 for the computer device 102 discussed in the above example of FIG. 1A. The screen capture image 134 is saved in a memory 136 to a temporary file 138 with a screen capture component 131. The image 134 may be used to generate a service request to a remote location with the saved image, such as to a helpdesk 118', for example, or some other receiving party.

The user interface system 126 of the imaging device 122 has a user interface 112' that displays a pop-up menu or other graphical user interface (GUI) with a menu of selectable options 111', which can be activated. The selectable options 111' are presented in the pop-up menu or other GUI in response to the screen capture input and concurrent with the screen capture image 134 being saved to memory 136. A post-processing processor 133 executes the selectable options 111' with a fill-in feature corresponding to application resources present within the system 122. For example, if the user inputs an email option from the selectable options, the post-processor 133 generates the email functionality through the control panel of the user interface 126 and communicates via a communication link 135 or a module within the system with an email having the screen capture image 134 attached thereto.

The selectable options 111 and 111' may vary in type and number, and are not limited to the options (e.g., a. and b.) illustrated in FIGS. 1A and 1B. Various interface features may be provided within the screen having the selectable options 111 and 111'. For example, the GUI having the selectable options 111 and 111' may include a drop-down list as a user interface control GUI element, similar to a list box, which allows the user to choose one value from a list. When a drop-down list is inactive, it displays a single value or a category title as illustrated. When activated, it displays (drops down) a list of values or selections, which the user may select from. When the user selects a new option, for example, the control can revert to its inactive state, displaying the selected value. Other features may also be presented in the user interface, such as a drop-down list, a list box, tabs, etc. and the present disclosure is not limited to any type of GUI interface herein.

In one example, the selectable options 111 and 111' may provide for the screen capture image 107 and 134 to be communicated to a helpdesk 118 or 118'. The help desk 118 or 118' may receive a helpdesk request accompanying the screen capture image 107, 134 from various machines, such as the computer 102 and/or the xerographic image forming device 122 for diagnosing a technical difficulty presented on a display or a display panel. The helpdesk can process the information to diagnosis or analyze information presented in a screen capture image 107, 134. The xerographic imaging machine, the computer, or other device, for example, may provide this information automatically when a user inputs a combination of keystrokes or provides an input. In other embodiments, the user is presented with the plurality of selectable options 111, 111' when providing a screen capture input at the same time that the screen capture image 107, and/or 134 is captured and saved to a temporary file, all in response to a screen capture input provided at the I/O device 108, or 126 such as a keystroke combination, a single keystroke, a touch screen input or other input being provided.

Figure 2:
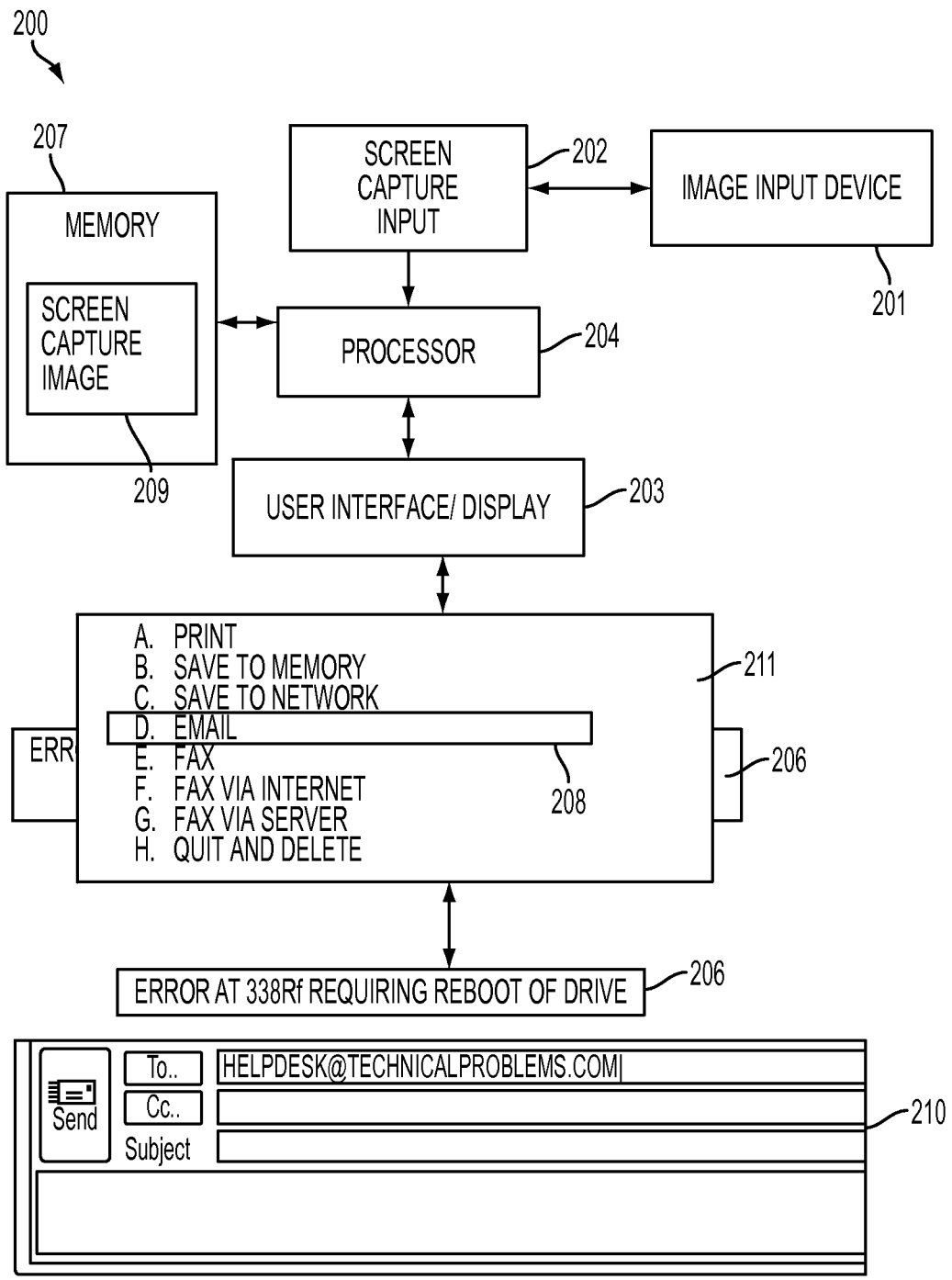
FIG. 2 is a representation of an image forming system according to aspects of exemplary embodiments of the disclosure.
Figure 3:
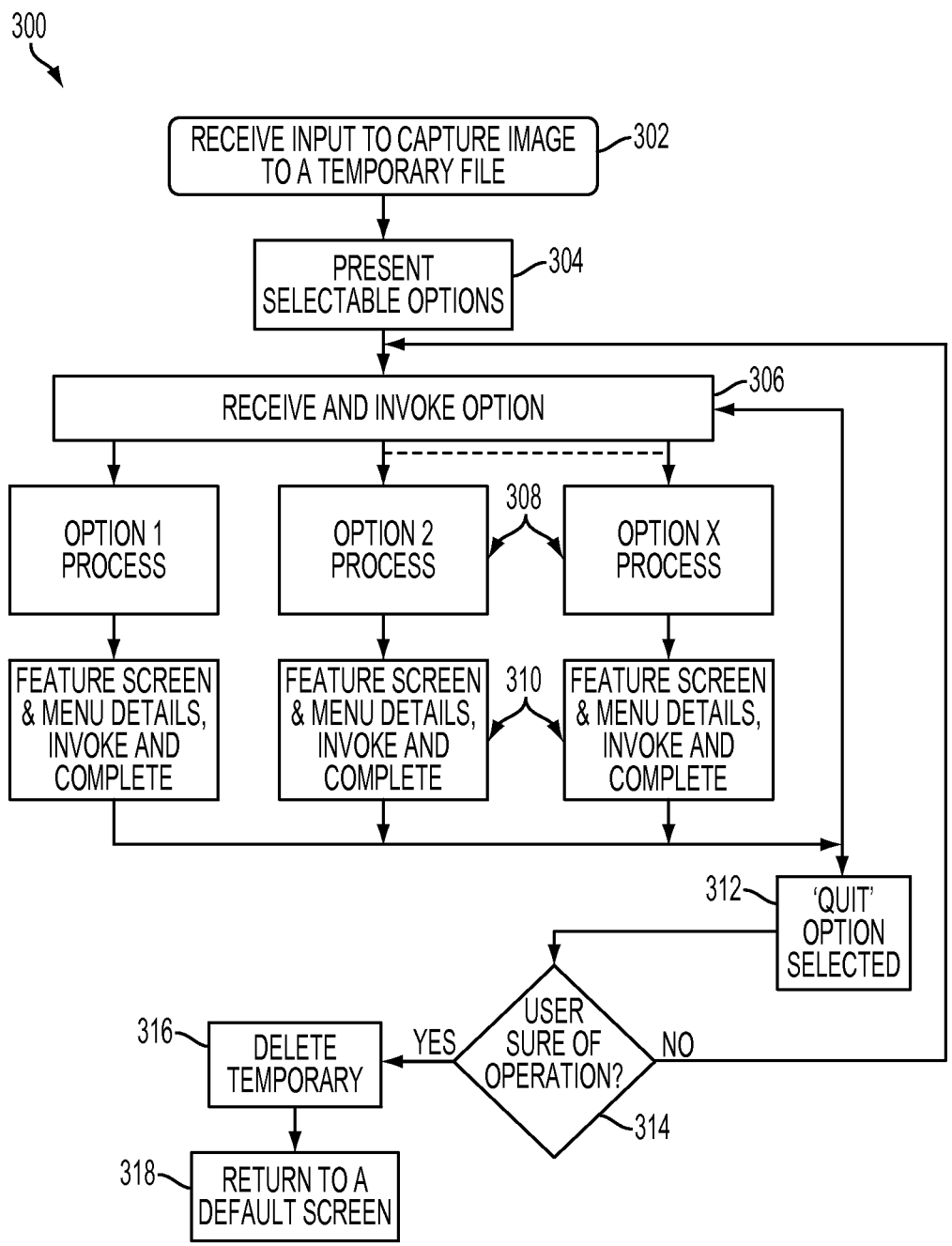
FIG. 3 is a flowchart detailing an exemplary method for capturing a screen capture image according to aspects of exemplary embodiments of the disclosure.

Referring now to FIG. 2, illustrated is an exemplary embodiment of an image forming system, such as a xerographic printing machine that transfers toner for an image on a print medium. The system 200 has a processor 204 coupled to an image input device 201 and a memory 207. The image input device 201 communicates a screen capture input 202 to the processor 204 for creating a screen capture image 209 and saving the image into the memory 207. The screen capture input 202 can be a software initiated signal and/or a hardware initiated signal caused by a combination keystroke, keypad, or other control of the image input device 201'. Upon receiving the screen capture input, selectable options 211 are presented in a user interface of a display 203. The selectable options 211 are displayed together with the screen capture image 209 being saved in the memory 207. The selectable options include at least one or more of: a print option, a save image to the memory option, a save image for reprint option, a save to network option, an email image option, a fax image option, a send image via Internet fax option, a send image via server fax option, and a quit while delete image option. Additional, options corresponding to the screen capture image are also envisioned and the selectable options are not limited herein. For example, similar to the fax options each pertaining to a method of communication, the email option may further be divided into addresses to email the screen capture image to, which uses available email resources for an email application function of the system 200.

The selectable options 211 are presented in a pop-up menu that can overlay the default screen, which has images 206 therein with graphical, text and/or other symbolic content that has been saved to capture the screen contents as viewed by a user. The selectable options 211 correspond to a task for the screen capture image 209. Each of the selectable options may be titled with a description of a respective task. For example, print, fax, save, etc. may be listed in the pop-up menu. The selectable option in the menu presented to the use each operate to invoke at least one application function 210 available on the system 200 for post-processing the tasks related to the selectable options 211 for the screen capture image 209.

Each selectable option has at least one application function 210 that has menu details (e.g., address bar, location for saving, machine to fax to, and the like) associated therewith. FIG. 2 illustrates an email option 208 that has been selected by a user. In one embodiment, the application function corresponds to the task of emailing the screen capture image to an outside client or external device, for example. The email function or other application function may be automatically populated with a help desk email address for sending and/or have the screen capture image 209 attached thereto. By way of other example, if the print selectable option is selected, the application function and menu details would be different and utilize print applications available to the processor 204 with associated menu details therewith.

In one example, the screen content 206 of the screen capture image 107' may include an error message among other content present in a current or default screen captured at the time of the screen capture input 202. In addition, other content information 206 can be inserted within the screen capture image 209 that includes data associated with the image forming apparatus, such as a serial number, a machine IP address, and a software set or resources in which the data pertains thereto. For example, a user of the system 200 may provide a combination of keystrokes that puts the system into a special mode of operation that invokes the list of selectable options 211 and saves a copy of the screen capture image 209 to a temporary file for use with the additional content. After each option is selected, a confirmation (not shown) may be provided to the user. Then the option is executed with the application function and associated menu details associated with processing a task of the selectable option. For example, the screen may be faxed to a provider of a helpdesk where a help ticket, job ticket, service ticket or the like may be generated to service the error at the system 200. Afterwards, the user may continue to select or choose selectable options by providing a selectable option input at the user interface/display 200. Once the user is finished with manipulating the screen capture image, the user may quit/exit and delete the temporary file holding the screen capture image 209. Alternatively, another option that could be presented is to quit only without deleting the image, where the image may be edited and/or stored for later use for presentation purposes or other user desired activities.

Example methodologies for implementing a user interface system for capturing contents displayed in a screen with a screen capture image are described below and with reference to FIGS. 1A and 1B for illustration. While the method(s) are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

In one embodiment, the method 300 initiates at 302 when an input to capture a screen image is received at an input device, for example. A screen capture image 107, 134 is saved to a temporary file 109, 138 in a memory 104, 136 with a processor for example. The screen image 107, 134 includes content having graphical, textual and/or other images therein. In certain embodiments, only portions of the screen may be captured or all of the initial (default) screen. The input received is from a touch screen input, a keyboard/keypad stroke combination or other like input. In addition to the screen being copied to form a screen capture image 107, 134, additional information can be added to the screen that can help facilitate analysis and diagnostic review at a helpdesk. For example, data associated with the screen capture image is inserted within the screen capture image. The data includes a serial number, a machine IP address, and/or a software set (e.g., software properties of the operating system, or other application properties being used by the system) that relate to the image forming machine.

At 304, selectable options 111, 111' are presented to the user in response to the screen capture input. These options may be different options related to functions of the user interface for processing the captured screen image. In one embodiment, the selectable options 111, 111' are presented in a pop-up screen or separate window that provides the selectable options 111, 111' in a user interface menu. Other GUI controls may also be invoked, such as a drop-down box, slot machine interface design, or a voice recognition software for selecting the selectable options. The disclosure is not limited to a particular one GUI interface control.

At 306, the selectable option input is received form a user and processed via a processor 204, post processor 115, or 133, for example. Processing the selectable option includes allocating resources to the processor that correspond with an application function having menu details associated therewith. Each selectable option corresponds to a task for processing the screen capture image saved in memory. For example, if the user chooses to email the capture image directly to a helpdesk 118, 118' the task of emailing is activated by the option input received and the processor is given priority to resources of the system, such as processing memory, the captured image, as well as application, processes and services using the memory above any other application requirements of the computer or image forming apparatus system. Menu details, like an address bar, a send to bar, send button, etc. fill the application function for the email option. Other options are also envisioned and are not limited in number or type herein.

For example, a plurality of application functions present in the system may be associated or correspond to selectable options 111, 111' presented to the user for conveying the screen capture image. At 308, a plurality of selectable options are presented and/or selected by the user. For example, option 1 may include a print image now option that allows a user to use the existing functionality of a print application together with associated menus details at 310. The document to be printed may be populated with the location of the screen capture image and once the print option is completed, the user may decide to mail the copy, scan it or the like to convey the information for diagnosis, for example, or other use. In other options, a save image to a machine drive or saving the image for reprint may be option 2 at 308. The save as or other application functionality for files may be presented as a feature screen that is a pop-up screen within the interface and is a second screen having the selectable options therein. Other options may also be provided, such as save to network option, an email image, which optionally may have the helpdesk email address filled in the featured menu screen associated with the email application function, a fax image option, a send image via internet fax, a send image via server fax, and a quit option 312.

The process flow continues to cycle back to 306 where an input is received to invoke the selectable options until the quit option at 312 is selected. When the option to quit is selected at 312, the process flows to a question at 314 for confirmation of the selection. If the user provides positive confidence in the quit selection (YES), then the process flows to 316 where the screen capture image is deleted from the temporary file in which it was saved. Then at 318 the display screen is returned to the default screen before the screen capture image input had been received.

An advantage of the method 300 is that customers can accurately convey information to another (e.g., a helpdesk or different external device) with a single input made by a combination of keystrokes at the same time. This allows for a screen image (default screen) to be processed with multiple options for processing the saved image concurrently. Apart from a cost savings, this may result in the making the job request easier for analysis or technical care in terms of quantifying a problem, establishing a work order request and the like.

The methods illustrated may be implemented in a computer program product that may be executed on a computer or on a mobile phone in particular. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for capturing contents displayed in a display screen executed via a processor of an image forming apparatus with a memory that stores executable instructions having the method, comprising:

receiving a screen capture input;

capturing a screen capture image of printing error content displayed in the display screen in response to the screen capture input received by the processor;

providing selectable options to the user in a user interface menu in the display screen concurrent with capturing the screen image and in response to the screen capture input received by the processor;

receiving an option selection input for at least one selectable option;

processing the selectable option in response to the option selection input;

providing an application function and associated menu details based on a task that corresponds to the at least one selectable option; and editing screen content of the screen capture image by inserting additional information within the screen capture image including data associated with the image forming apparatus comprising a serial number, a machine IP address, and a software set in which the data pertains thereto, and wherein the apparatus is a xerographic imaging device having xerographic components that include includes a transfer station that transfers toner to a print medium.

2. The method of claim 1, wherein processing the selectable option includes allocating resources of the apparatus to the processor that correspond to the application function and associated menu details, wherein a plurality of application functions and associated menu details respectively correspond to the selectable options, wherein the selectable options include different tasks associated with the screen capture image.

3. The method of claim 2, further comprising:

prioritizing the application function and associated menu details as a first priority for resource allocation in the user interface to be processed before other application functions of the apparatus.

4. The method of claim 3, wherein the option selection input is received from an input/output device of the image forming apparatus at a pop-up screen that provides the selectable options in the user interface menu, and the screen capture input is received via a combination of keystrokes of a keypad and/or a voice recognition component.

5. The method of claim 1, further comprising:

communicating the screen capture image to a helpdesk via an Internet Protocol for a diagnostic review.

6. The method of claim 1, further comprising:

saving the image captured to a temporary file on the image forming machine, wherein the contents include images and text displayed in the display screen.

7. The method of claim 1, further comprising:

presenting the application function and associated menu details that correspond to the task associated with the at least one selectable option to the user in the display screen to receive a confirmation input, wherein the user interface menu includes a pop-up screen that displays the selectable options in the display screen; and attaching the application function and associated menu details with the screen capture image.

8. The method of claim 1, wherein providing the selectable options to the user in a user interface menu in the display screen comprises:

displaying one or more of the following options concurrent with capturing the screen image in response to the screen capture input received by the processor:

a print option, a save image to the memory option, a save image for reprint option, a save to network option, an email image option, a fax image option, a send image via internet fax option, a send image via server fax option, and a quit while delete image option; and upon receiving the selectable option input associated with the email image option, populating the application function and associated menu details corresponding to the email option with a helpdesk email.

9. An image forming system, comprising:

a memory coupled to a processor having resources and instructions for executing commands received;

a display configured to display a user interface having graphical images and/or text in a first screen;

a screen capture component that captures a screen capture image of the graphical images and/or text within the first screen and saves the image;

a post-processing engine that executes different selectable options within the user interface in a second screen of the display upon receiving a selectable option input, and wherein the post-processing engine edits screen content of the screen capture image by inserting additional information within the screen capture image that includes data associated with the image forming apparatus that includes a serial number, a machine IP address, and a software set in which the data pertains thereto; and at least one input/output device including a keyboard or keypad that receives a screen capture based on a combination of inputs thereat, wherein the screen capture input received thereat causes the input/output device to initiate the screen capture component and the post-processing component concurrently.

10. The system of claim 9, wherein the combination of inputs includes at least two keystrokes at the keyboard or keypad.

11. The system of claim 9, further comprising:

a fill-in feature component that matches each selectable option with one or more functions provided in the user interface for selection by the user;

a communication module that communicates the screen capture image to a helpdesk for troubleshooting; and a transfer station that transfers toner to a print medium;

wherein the apparatus is a xerographic imaging device having xerographic components.

12. The system of claim 11, wherein the features include a print feature, saving image feature, email feature, a fax feature, and a quit and delete feature associated with the selectable options, and the first screen is a default screen having content therein and the second screen overlays the first screen with the selectable options.

* * * * *